(12) United States Patent
Willis et al.

(10) Patent No.: US 8,999,081 B2
(45) Date of Patent: Apr. 7, 2015

(54) METHODS FOR CREATING SIDE-BY-SIDE METALLIC BONDS BETWEEN DIFFERENT MATERIALS USING SOLID-PHASE BONDING AND THE PRODUCTS PRODUCED THEREBY

(75) Inventors: Robert P. Willis, Lincoln, RI (US); Kelley Sullivan Mello, North Smithfield, RI (US); Joseph G. Kaiser, Barrington, RI (US)

(73) Assignee: Technical Materials Inc., Lincoln, RI (US)

( * ) Notice: Subject to any disclaimer, the term of this patent is extended or adjusted under 35 U.S.C. 154(b) by 648 days.

(21) Appl. No.: 12/982,089

(22) Filed: Dec. 30, 2010

(65) Prior Publication Data
US 2011/0206943 A1  Aug. 25, 2011

Related U.S. Application Data

(60) Provisional application No. 61/339,019, filed on Feb. 25, 2010.

(51) Int. Cl.
*B23K 20/22* (2006.01)
*B23K 20/02* (2006.01)

(52) U.S. Cl.
CPC ............ *B23K 20/028* (2013.01); *B23K 20/021* (2013.01); *B23K 2203/10* (2013.01); *B23K 2203/12* (2013.01)

(58) Field of Classification Search
CPC ............................. B23K 20/021; B23K 20/028
USPC .......................................... 148/516; 428/609
See application file for complete search history.

(56) References Cited

U.S. PATENT DOCUMENTS

| | | |
|---|---|---|
| 3,714,701 A | 2/1973 | Dion et al. |
| 3,868,762 A | 3/1975 | Nilsson |
| 4,798,932 A | 1/1989 | Dion et al. |
| 5,891,206 A | 4/1999 | Ellingson |
| 6,222,150 B1 | 4/2001 | Nomura et al. |
| 6,427,904 B1 | 8/2002 | Groll |
| 2006/0191396 A1 | 8/2006 | Dion et al. |

FOREIGN PATENT DOCUMENTS

| | | |
|---|---|---|
| JP | 08-294706 A | 11/1996 |
| JP | 09-323101 A | 12/1997 |
| JP | 2008-006496 A | 1/2008 |

OTHER PUBLICATIONS

Office Action issued May 8, 2012 in connection with Japanese Application No. 2012-502329.
International Search Report issued Mar. 8, 2011 in connection with parent PCT International Application No. PCT/US10/62552.
Official Action issued Oct. 30, 2012 in connection with Japanese Application No. 2012-502329.

*Primary Examiner* — Jie Yang
(74) *Attorney, Agent, or Firm* — Locke Lord LLP; Ralph A. Loren; James M. Acheson, Jr.

(57) ABSTRACT

Methods of producing composite products formed between at least two different metal structures in a side-by-side configuration are provided. The method includes providing at least two structures made of different materials that are not compatible for welding or conventional cladding processes. A geometric profile is provided in at least one of the edges of the first structure, and a corresponding mirror image of the geometric profile is provided in a corresponding edge of the second structure. The two structures are positioned together so that the profiled edge or edges form a complimentary composite structure and are then solid-phase bonded to form a composite product. The process may be repeated with additional structure at either end of the first or second structure to achieve multiple side-by-side products. The methods and corresponding products provided herein yield edge to edge products suitable for various electrical connection type applications.

17 Claims, 8 Drawing Sheets or

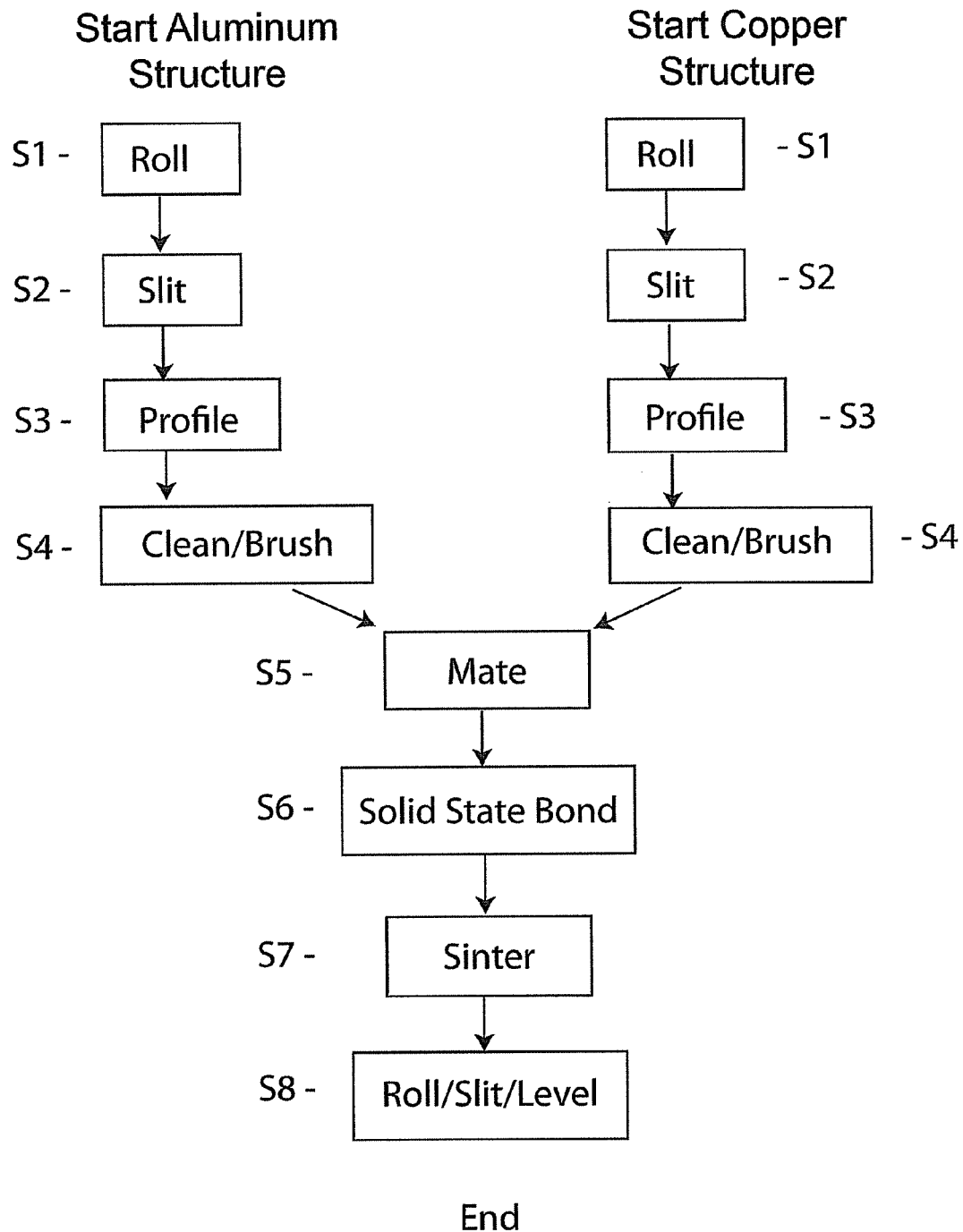

METHODS FOR CREATING SIDE-BY-SIDE METALLIC BONDS BETWEEN DIFFERENT MATERIALS USING SOLID-PHASE BONDING AND THE PRODUCTS PRODUCED THEREBY

CROSS REFERENCE TO RELATED APPLICATIONS

This application claims priority to U.S. provisional patent application Ser. No. 61/339,019 filed on Feb. 25, 2010. The entire content of this application is incorporated herein by this reference.

FIELD OF INVENTION

The subject invention is relates to metallic composite materials. More particularly, the subject invention relates to methods of creating a metallurgic bond in a side-by-side configuration between two different structures made of different materials using solid-phase bonding, and the composite products produced thereby.

DESCRIPTION OF THE RELATED ART

A single metal rarely offers the range of performance properties demanded by today's electronic and electrical connector/component applications. Designers frequently have to combine two or more materials with different, yet complementary, engineering properties in order to meet the demand for a truly competitive, highly reliable end product. Moreover, there is a considerable need for bonding of dissimilar materials edge to edge.

Welding and cladding are two common processes by which bonds can be formed between metal structures made of different materials. Welding is a fabrication process that joins materials, usually metals or thermoplastics, by heating the materials to form a liquid phase at the joint. This is typically done by melting the work pieces to form a pool of molten material that cools to become a strong joint. Essentially, the welding process uses heat, sometimes in conjunction with pressure, or by heat itself, to form a bond. Two conventional aluminum to copper welds are illustrated in FIGS. 1A and 1B.

Various types of welding are described in U.S. Pat. No. 4,798,932, the entire contents of which are incorporated herein by this reference. One disadvantage of welding methods are that they create a small but distinctive weld zone, composed of an alloy of the two metals being welded and a heat-affected area adjacent either side of the alloy. The weld zone is typically the weak link so that, under a tensile load perpendicular to the weld, the composite will usually fail at the weld zone rather than at one of the parent metals. Furthermore, the weld zone possesses characteristics dissimilar to those of the parent metals. These dissimilarities force design engineers to avoid this region and, therefore, incur increased costs due to increased metal consumption. Additional problems include sputter or blow holes in the weld zone, undercut (i.e., lack of weld penetration through the thickness of the composite), camber, and, because the metals are usually welded close to the finish gauge, relatively high production costs. Moreover, it is well known in the art that welding processes are not good for forming bonds between certain materials such as copper and aluminum because the thermal treatment involved in welding forms brittle intermetallics at the weld which weaken the bonds at the weld.

Cladding, or solid-phase bonding, is distinct from welding as a method to join metals together. Cladding refers to the bonding together of dissimilar metals metallurgically using high pressure, rather than a melting process as in welding. Cladding is typically achieved by extruding two metal structures through a die as well as pressing or rolling sheets together under high pressure. Normally, an overlay cladding process is used, where two material structures, such as aluminum and copper, are joined together one on top of the other, as is illustrated in FIG. 2A. In some circumstances, an inlay configuration is illustrated in FIG. 2B, is used. Cladding processes can produce a continuous strip of a composite material that can be sintered, rolled, and slit to meet very precise electrical, thermal, and/or mechanical end-use needs. The principal disadvantage of conventional cladding inlay processes are the creation of vertical bonds which have weaker bond strength, and lower tensile strength relative to horizontal bonds at the joint between the two structures.

In view of the disadvantages of known methods which are generally more suitable for joining like materials, there is a need for methods and products that provide high performance and cost-effective metallic composite products that are bonded side-to-side for a number of applications such as bus bars, terminals, battery cells and the like.

SUMMARY OF THE INVENTION

The subject invention is related to methods of producing composite products. More particularly, the subject invention relates to methods of creating a metallurgic bond between two different structures in a side-by-side configuration using solid-phase bonding and the composite products produced thereby. The methods and products herein are particularly useful for bonding materials such as aluminum and copper, for which welding, conventional cladding, and hot bonding processes are not suitable to produce a side-by-side end product. While the description herein describes the production of aluminum to copper bonds, the methods and systems of the subject invention can be used to create additional metallurgic bonds of a number of combinations of materials including aluminum to copper alloys, nickel, or other materials for which conventional welding processes produce brittle intermetallic phases. Use of the term "composite product" hereafter denotes a composite structure which has been solid-phase bonded.

The subject invention provides a method for creating a metallurgic bond between two or more different structures made of two or more different materials, particularly as it relates to bonding two materials in a side-by-side or edge to edge configuration. The subject invention provides a method for creating a metallurgic bond between at least two structures comprising the steps of: a) providing a first structure of a first material and a second structure of a second material, the first and second materials not being compatible for welding; b) positioning a first edge of the first structure having a first profile adjacent to a first edge of the second structure having a second profile, the first and second profiles being complementary, whereby the first and second profiles fit together to form a first composite structure; and c) solid-phase bonding and sintering the first composite structure to form a metallurgic bond between the first and second structures.

The method may further comprise the steps of profiling the first edge of the first structure to form the first profile and the profiling the first edge of the second structure to form the second profile, prior to positioning the first and second structures together at a first complimentary region. The first and second profiles may comprise a plurality of angles so that the first composite structure includes a plurality of non-vertical surfaces at the first complimentary region. The method may further comprise the step of providing at least one of the first and second structures in a plurality of sections. The plurality of sections may be positioned on top of each other as layers.

The subject invention may further comprise the steps of: d) providing a third structure of a third material, the second and third materials not being compatible for welding; e) positioning a first edge of the third structure having a third profile adjacent to a second edge of the second structure having a fourth profile, the third and fourth profiles being complementary, whereby the third and forth profiles form a second composite structure; and f) solid-phase bonding and sintering the complimentary second composite structure to form a metallurgic bond between the second and third structures. In one embodiment, steps c) and f) occur substantially at the same time. The first and third materials may be substantially the same.

The invention may further comprise the steps of: profiling the first edge of the third structure to form the third profile and profiling the second edge of the second structure to form the fourth profile, prior to positioning the second and third structures together at a second complimentary region. The third and fourth profiles may comprise a plurality of angles so that the complimentary second composite structure includes a plurality of non-vertical surfaces at the second complimentary region. The first profile and the third profile may also be substantially the same.

The third structure may be provided in a plurality of sections. The plurality of sections may be positioned on top of each other as layers or side by side. In another embodiment, the method also includes the step of: splitting the first composite structure and the second composite structure after forming the metallurgic bond. The first, second and third structures may be selected from a number of structures, for example, a wire, a rod, a slug, a slab and a block of a metallic material.

The invention also provides creation of a metallurgic bond between at least two structures according by the steps of: a) providing a first structure of a first material and a second structure of a second material, the first and second materials not being compatible for welding; b) providing a geometric profile in an edge of the first structure; c) providing an opposing geometric profile in an edge of the second structure; d) positioning the profiled edge of the first structure adjacent to the profiled edge of the second structure at a complimentary region so that they mate to form a composite structure; and e) solid-phase bonding and sintering the composite structure to form a metallurgic bond between the first and second structures. Similar to other exemplary methods described, herein, the geometric profiles may also comprise a plurality of angles so that the composite structure includes a plurality of non-vertical surfaces at the complimentary region. The method may further comprise the step of providing at least one of the first and second structures in a plurality of sections.

The subject invention also relates to products suitable for a number of applications. The subject invention may form a composite structure that is suitable for use as an electrical interconnect formed of two different materials at opposing ends. The composite structure comprises a first structure of a first material and a second structure of a second material, the first and second materials not being compatible for welding, the composite structure having a junction area in the form of a solid-phase, sintered metallurgic bond between the first and second structures, wherein the junction area has a geometric profile including a plurality of non-vertical surfaces. The first material of the composite structure may be aluminum and the second material may be copper, for example.

The methods and products of the subject invention are suitable for other applications including bus bars, straps for lithium battery cells and other applications in which a bridge connection consisting of two different materials which are electrically connected at opposing ends are needed. These and other aspects and advantages of the subject invention will become more readily apparent from the following description of the preferred embodiments taken in conjunction with the drawings.

BRIEF DESCRIPTION OF THE DRAWINGS

So that those skilled in the art to which the subject invention appertains will readily understand how to make and use the method and device of the subject invention without undue experimentation, preferred embodiments thereof will be described in detail herein below with reference to certain figures, wherein:

FIG. 3 is a flow chart of a detailed processing method of creating a metallurgic bond between aluminum and copper materials according to an exemplary embodiment of the subject invention;

DETAILED DESCRIPTION OF THE INVENTION

Figure 1A:
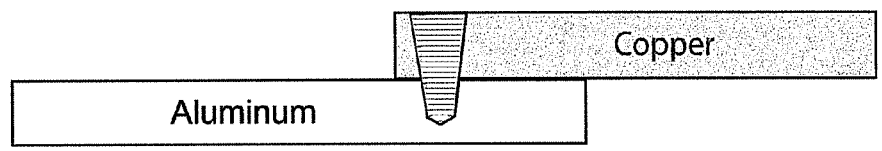
FIG. 1A illustrates a cross-sectional view of a metallic bond of aluminum and copper using a conventional welding process.
Figure 1B:
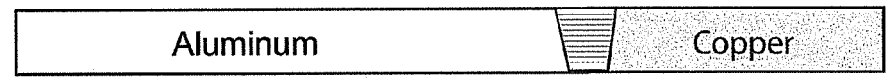
FIG. 1B illustrates a cross-sectional view of an alternative configuration of a metallic bond of aluminum and copper using a conventional welding process.
Figure 2A:
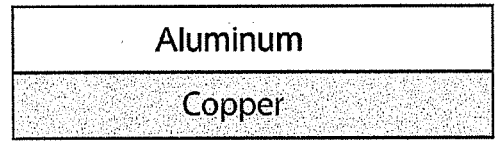
FIG. 2A illustrates a cross-sectional view of an overlay product of aluminum and copper produced by conventional cladding.
Figure 2B:
FIG. 2B illustrates a cross-sectional view of an inlay product of aluminum and copper produced by conventional cladding.

Preferred embodiments of the subject invention are described below with reference to the accompanying drawings, in which like reference numerals represent the same or similar elements. The figures are not drawn to scale.

In general, the materials of the structures used to form the metallic composite products according to the subject invention have the following properties: they have sufficient ductility during the bonding process; they are capable of being cut or milled; and they have similar yield strengths, ductility and extrusion behavior. While a specific choice of material is based on a desired application, the subject invention is described below in terms of the formation of exemplary aluminum and copper bonds. The subject invention, however, is neither limited to metallurgic bonds involving only aluminum and copper, nor to the exemplary manufacturing parameters and material dimensions described herein. The subject invention overcomes the problems of conventional welding and cladding processes to achieve metallic bonds in a side-by-side configuration utilizing materials that form brittle intermetallics under welding conditions. These and other advantages and benefits of the subject invention are described herein.

Referring to FIG. 3, a flow chart of an exemplary method of creating a metallurgic bond between aluminum and copper materials according to the subject invention is shown. Although it is advantageous to perform each of the steps S1-S8 described herein in order to achieve the advantages of and benefits of the subject invention, some aspects are optional and are described in detail solely for exemplary purposes.

At a start of the process described in FIG. 3, aluminum and copper structures are matched or rolled S1, e.g., machined, as necessary, in thicknesses, temper and hardness. The structures described herein for purposes of exemplary illustration are strips of aluminum and copper. However, the structures may be selected from a number of structure types, including, for example, wires, rods, slugs, slabs and blocks of a metallic materials. Step S1, if needed, can be customized based on the dimensions and characteristics of the beginning materials and the desired dimensions of the end product. Both the aluminum and copper are then slit S2 or machine cut with a rotary blade and edgeskived, as necessary, in order to achieve a desired width. Rolling S1 and slitting S2 are optional steps and may be performed for ease of manufacture as needed. In production, it is advantageous to achieve uniformity of the thickness and temper of the two structures in order to match the yield strength of the two materials. Another optional edgeskive step may be used to side mill the edges of the aluminum and copper structures in order to create square edges. Any known edgeskiving machine can be used to perform this step as desired. In addition, a flattening step may be used to power flatten both structures. During the optional flattening step, as the structures pass through the rollers, they come out flat and straight, producing about a reduction and matching in thickness. Appropriate processing adjustments can be made based on the type commercial roller machine used.

Figure 4:
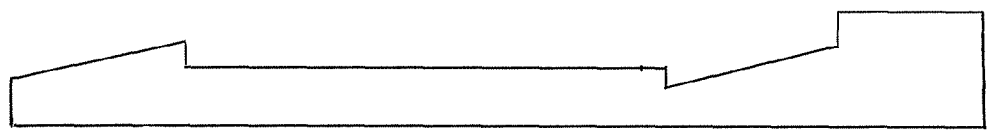
FIG. 4 illustrates an exemplary geometric profile resulting from a profiling step in FIG. 3.

The aluminum and copper structures are then profiled S5 to create the geometric profile in one edge of the aluminum structure and the corresponding mirror image of the geometric profile in the corresponding edge of the copper structure or vice versa. The profiling step S5 can be performed in a number of ways including, for e.g., roll-forming, edge-skiving or milling. In one embodiment, rotary milling cutters are used to remove metal in multiple profiling steps, such that a geometric profile is created in the adjoining edges of the aluminum and copper structures. See, for example, the profile shown in FIG. 4. Because vertical edges of a metallic bond between aluminum and copper have lower tensile strengths relative to horizontal edges, it is beneficial to perform angular tapering of the geometric profile in order to enhance the bonding behavior of the composite structure. Accordingly, it is desirable to have the geometric profile consist of angles such that one or more non-vertical surfaces are created at the bonding site.

Preferably, a mechanical snap fit is substantially achieved between the adjoining edges of the two structures in order to increase the transverse tensile strength of the bond and decrease defects caused by air bubbles and gaps between the structures. The adjoining profiled edges may also interlock when positioned together. However, the profiled edges need only fit together in a complimentary fashion to achieve the benefits and advantages of the subject invention.

The specific geometric profile is selected based on a desired strength of the bond joint at the complimentary region. A number of profiles other than the exemplary one shown in FIG. 4 may be utilized so long as the shape of a first structure is the minor image of the shape of the second structure as shown in FIGS. 5-10B. The complimentary nature of the geometric profiles helps to minimize gaps and other flaws in the bond joint at the complimentary region, thereby increasing bond strength of the resulting composite product. Both metals may be cleaned with water or other aqueous solution and/or brushed S4 in order to move oils from the lubricant that may be used during the profiling step S3. The optional brushing serves to mechanically roughen the surface of the structures if desired.

The profiles of the aluminum and copper structures are then mated together S5 so that they are positioned adjacent to one another at the complimentary region to form a composite structure. The composite structure is then solid state bonded S6. A rolling machine using hardened rollers, may be used to perform the stolid state bonding step S6. During rolling, the composite structure never enters into a liquid phase as in a welding process. Rather, only the pressure and resulting heat created from the force of the rollers is used to promote bonding of the adjoining profiled edges of the composite structure. This feature is particularly important because, at elevated temperatures, brittle intermetallic phases can be created at the bond formation site which can interfere with the tensile strength and toughness of the bond. In order to overcome this problem, the subject invention uses solid-phase bonding to reduce the formation of brittle intermetallics at the bonding site. During the bonding process step S6, approximately a two-thirds reduction in thickness and/or corresponding increase in length can be achieved.

After the mechanically mated structures are solid-phase bonded S6, the bond is made permanent using a sintering step S7. Sintering is a thermal treatment that provides additional solid state diffusion of atoms at the bond interface. During the sintering step S7, it is important for the heat treatment to take place only for a short time and at a low enough temperature that melting does not occur to avoid the formation of brittle intermetallics. Typically, the sintering step S7 is less than five minutes, and preferably one to two minutes. For example, the composite structure may be sintered for a short time at approximately 300 degrees F. below the melt temperature of the lower melting point aluminum component. The remaining optional rolling and slitting leveling steps S8 are performed to achieve the desired dimensions of a composite product for a given final application.

Figure 5:
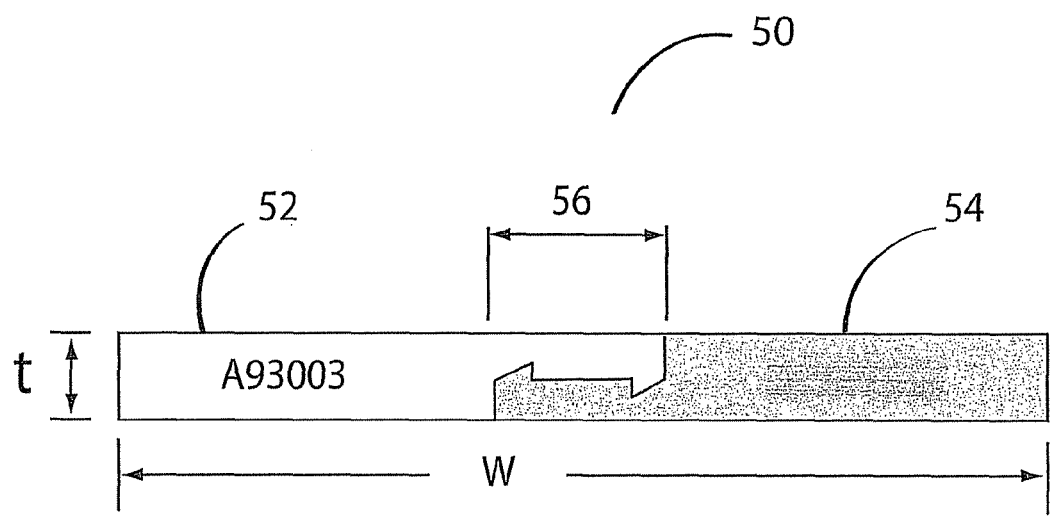
FIG. 5 is a cross-sectional view of an exemplary composite structure produced according to the method described in FIG. 3.

FIG. 5 illustrates a cross-sectional view of an exemplary composite product 50 produced according to the present invention. Composite structure 50 is formed of a first structure 52 and a second structure 54 which have been profiled with a geometric profile having a number of non-vertical edges and mated at the complimentary region 56. The he first and second structures 52 and 54 interlock when positioned together. Those skilled in the art would understand to make appropriate adjustments to the machinery parameters, such as gauge or thickness t and width w of the composite structure 50, based on the desired dimensions for a given application.

Figure 6A:
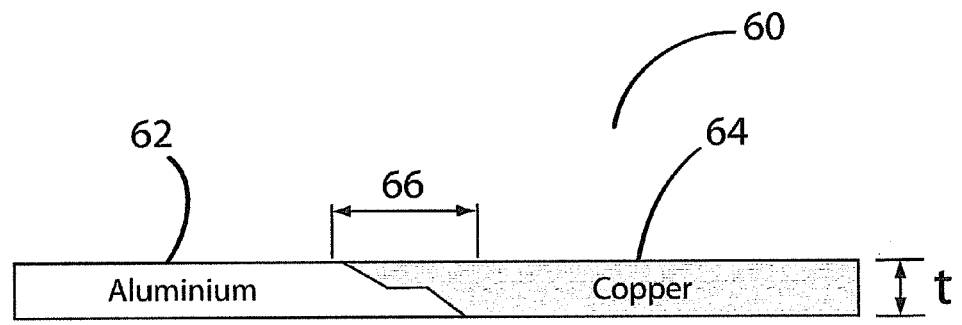
FIG. 6A is a cross-sectional view of an exemplary composite structure prior to solid phase bonding having a graded-slope profile.
Figure 6B:
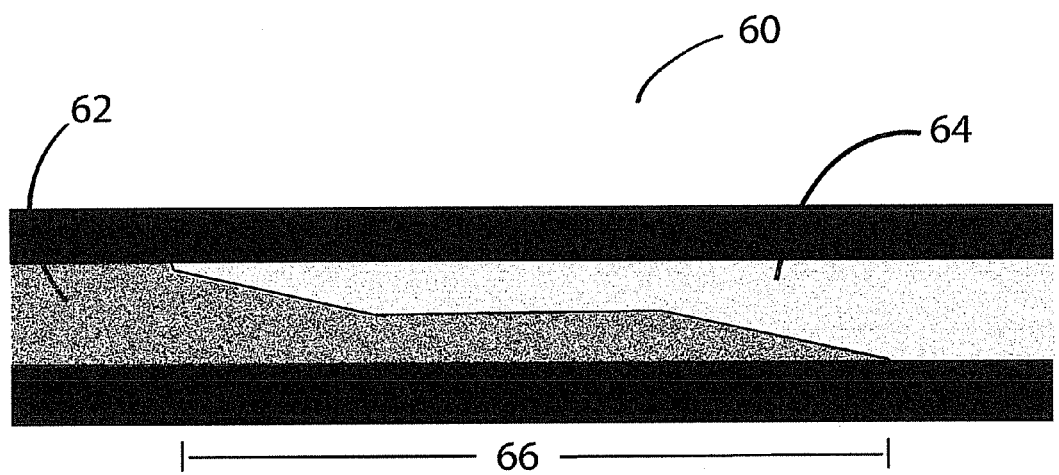
FIG. 6B is a cross-sectional photomicrograph of the composite structure of FIG. 6A after solid-phase bonding.

FIG. 6A is a cross-sectional view of another exemplary composite structure 60 produced according to the present invention. Here, the composite structure 60a is made of first structure 62 and second structure 64 shown prior to the solid phase bonding. The first and second profiles of first structure 62 and second structures 64 are complementary, and fit together to form the composite structure 60. The first structure 62 and second structure 64 mate at the complimentary region 66. FIG. 6B illustrates the cross-sectional photomicrograph of the product formed after the composite structure 60 has been solid-phase bonded in step c). The geometric profile at the complimentary region 66 shown in FIGS. 6A-6B can be described as a "graded-slope" profile with two edges having approximately the same slope, with a substantially horizontal edge in the middle, and no vertical edges.

Figure 7A:
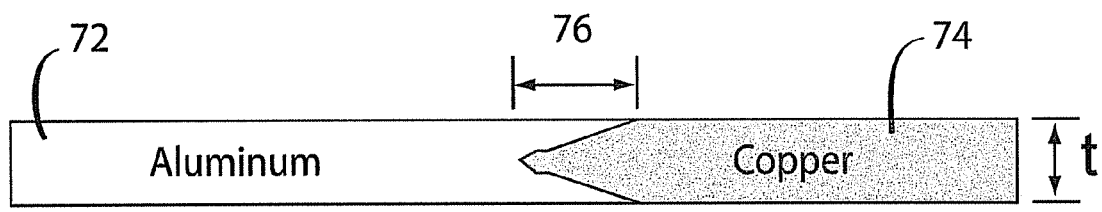
FIG. 7A is a cross-sectional view of an exemplary composite structure prior to solid phase bonding having a horizontal v-shaped profile.
Figure 7B:
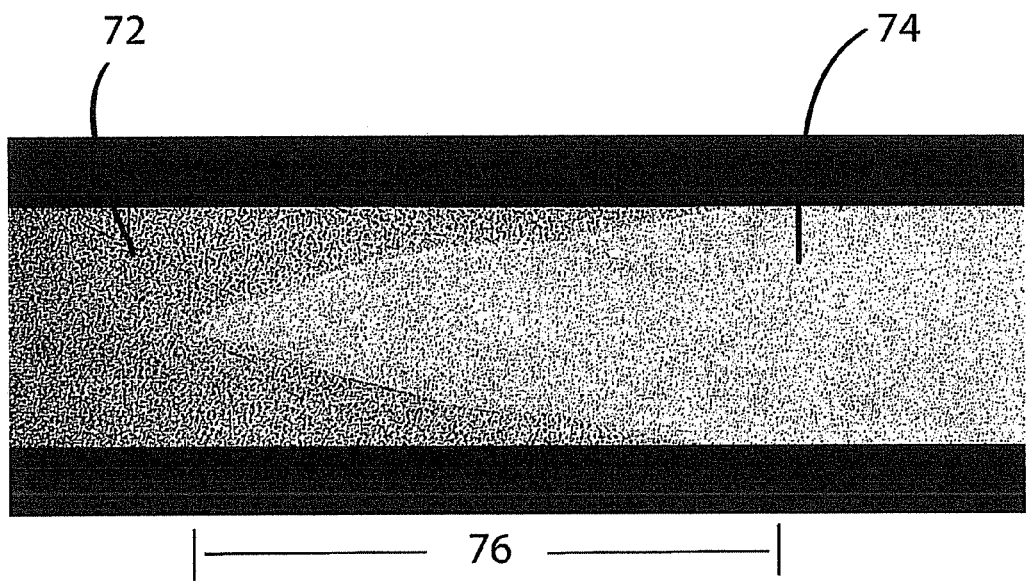
FIG. 7B is a cross-sectional photomicrograph of the composite structure of FIG. 7A after solid-phase bonding.

FIG. 7A is a cross-sectional view of another exemplary composite structure 70 prior to solid phase bonding. The first and second profiles of first structure 72 and second structure 74 fit together to form the composite structure 70 at the complimentary region 76. FIG. 7B illustrates the corresponding cross-sectional photomicrograph of the product formed after the composite structure 70 has been solid-phase bonded. The geometric profile at the complimentary region 76 shown in FIGS. 7A-7B can be described as a "horizontal V-shaped" profile having no vertical edges.

Figure 8A:
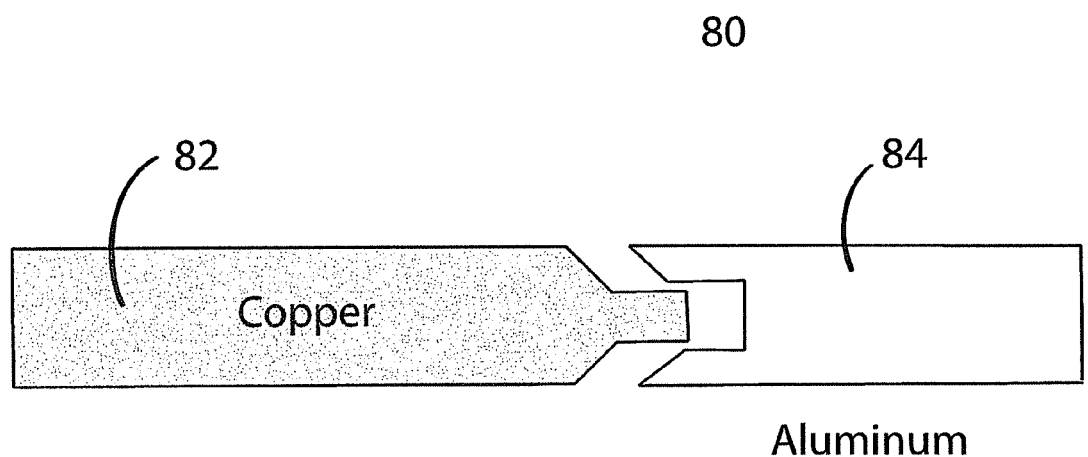
FIG. 8A is a cross-sectional view of first and second structures being positioned together along complimentary profiled edges to form an exemplary composite structure prior to solid phase bonding having a dovetail-shaped profile.
Figure 8B:
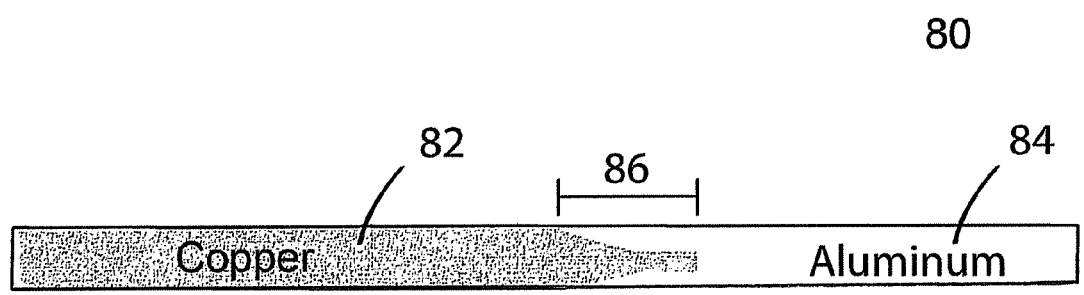
FIG. 8B is a cross-sectional view of the composite structure of FIG. 8A after solid-phase bonding.

FIG. 8A is a cross-sectional view of another exemplary composite structure 80 prior to solid phase bonding. The first and second profiles of first structure 82 and second structures 84 are complementary, and are shown as they are being position together to form the composite structure 80 at the complimentary region 86. FIG. 8B illustrates the corresponding cross-sectional view of the product formed after the composite structure 80 has been solid-phase bonded. The geometric profile at the complimentary region 86 shown in FIGS. 8A-8B can be described as a "dovetail-shaped" profile having only one substantially vertical edge. In this configuration the relatively weak vertical joint is limited to the centerline location, which maximizes the bond strength of surface layers, yielding a superior performance in bending and forming applications.

Figure 9A:
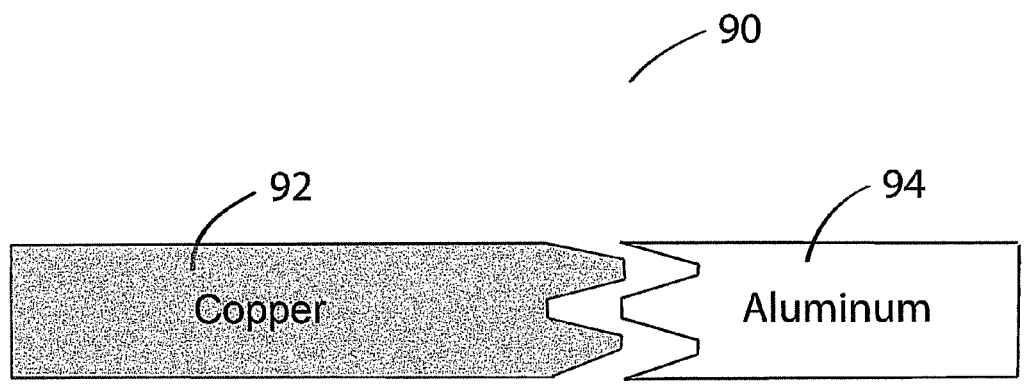
FIG. 9A is a cross-sectional view of an exemplary composite structure prior to solid phase bonding having a horizontal w-shaped profile.
Figure 9B:
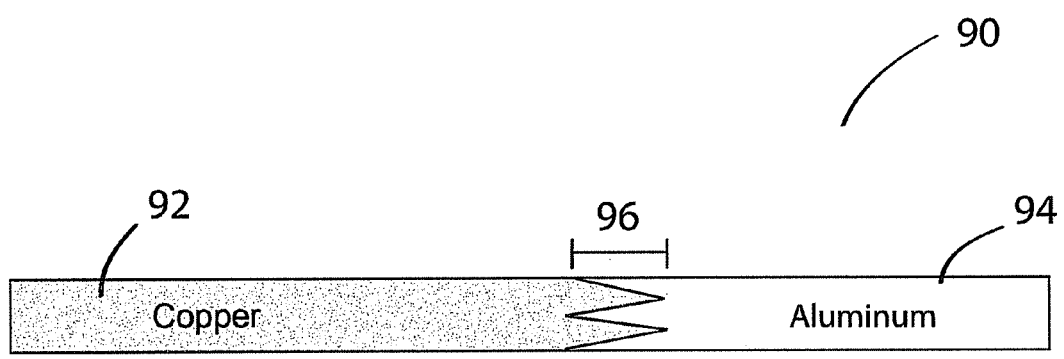
FIG. 9B is a cross-sectional view of the composite structure of FIG. 9A after solid-phase bonding.

FIG. 9A is a cross-sectional view of another exemplary composite structure 90 prior to solid phase bonding. The first and second profiles of first structure 92 and second structures 94 are complementary, and are shown as they are being positioned together to form the composite structure 90. First structure 92 and second structure 94 join together at the complimentary region 96. FIG. 9B illustrates the corresponding cross-sectional view of the product formed after the composite structure 90 has been solid-phase bonded. The geometric profile at the complimentary region 96 shown in FIGS. 9A-9B can be described as a "horizontal W-shaped" profile.

Figure 10A:
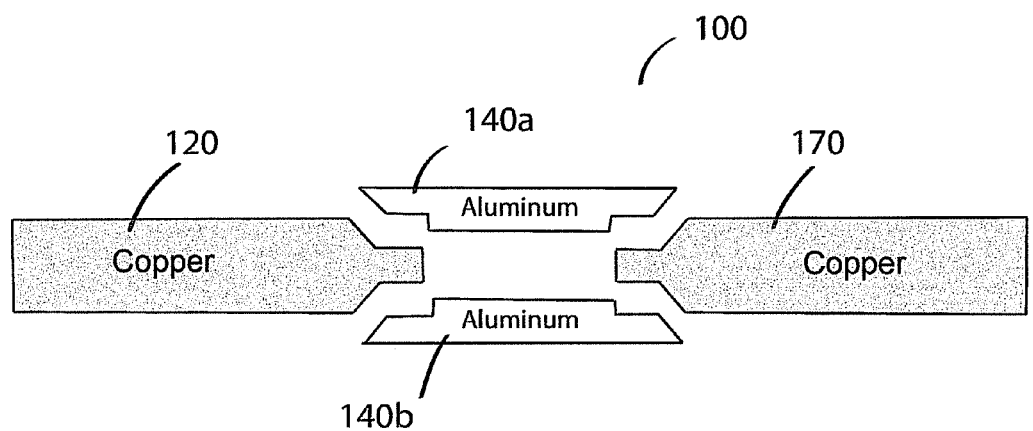
FIG. 10A is a cross-sectional view of first, second and third structures being positioned to interlock and form an exemplary composite structure prior to solid phase bonding, the second structure being provided in two layers, each having a dovetail-shaped profile.

FIG. 10A is a cross-sectional view of another exemplary composite structure 100 prior to solid phase bonding. The composite structure 100 is actually formed of a first structure 120, second structure 140 and third structure 170 that are positioned together. Only second structure 140 is shown provided in multiple layers 140a and 140b, stacked on top of each other. However, each structure may be provided in multiple layers to create the first and second geometric profiles.

Figure 10B:
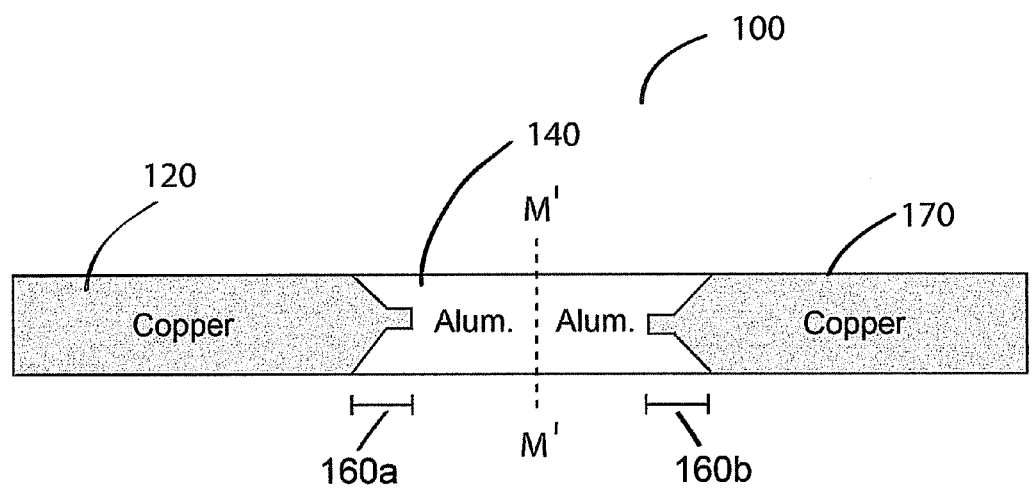
FIG. 10B is a cross-sectional view of the composite structure of FIG. 10A after solid-phase bonding and prior to being cut along line M'-M' to form two separate products, each product having approximately the same geometric profiles at the complimentary region as that of the composite structure formed in FIG. 8B.

FIG. 10B illustrates the corresponding cross-sectional view of the composite product formed after the composite structure 100 has been solid-phase bonded. FIG. 10A illustrates the resulting composite structure 100 after the first structure 120, second structure 140 having layers 140a and 140b are positioned and bonded together at the complimentary regions 160a and 160b. While only two layers 140a and 140b are illustrated here, the subject invention proposes that a plurality of layers may be layered on top of one another. Alternatively, or in combination with multiple layers, the structures may be provided in sections and pieced together to achieve a desired geometrical profile and corresponding composite structure (not shown).

During the bonding process, layers 140a and 140b are seamlessly joined together so that they are completely integrated, and no separation between the layers 140a and 140b is detectable. The geometric profile at the complimentary regions 160a and 160b shown in FIGS. 10A-10B can be described as a "dovetail-shaped" profile, similar to the composite structure in FIG. 8B. While geometric profiles are illustrated as being identical in FIG. 10B, it is within the contemplation of the subject invention that the respective edges of the second and third structures can be machined differently such that the second geometric profile 160b is different from the first geometrical profile 160a.

This embodiment is advantageous because two different products can be solid-phase bonding simultaneously and cut into two pieces along line M'-M' to form two separate products. Typically the first structure 120 and the third structure 170 are made of the same material. In FIGS. 10A-10B, first and third structures 120, and 170 are shown here both as copper structures. As a result, the bonding steps between the first and second structures 120 and 140 and the second and third structures 140 and 170 may occur substantially at the same time. However, it is also possible to have a third structure 170 which is different from the first structure 120. Accordingly, the rolling and sintering parameters must be adjusted accordingly. Similarly, the bonding step of the second and third structures 140 and 170 can occur at the same time, or the steps may be repeated such that the composite structure 100 is formed in a piecemeal fashion. These steps may be repeated in order to create any number of composite structures and cut if necessary to produce separate products. For example, multiple parallel strips may be created for an application in which different resistance values are needed at each end of an electrical connector.

The methods and products of the subject invention are suitable for a number of applications including, but not limited to, bus bars, terminals, battery cells and the like. For example, in Lithium ion batteries, packs of cells are bonded together. Most often, the cathode of the battery is aluminum and the anode is copper or some copper alloy. When electrically joining the anode and cathode of a lithium ion battery cell, a bus bar or strap made of two different materials utilizing the products and methods of the subject invention is advantageous. The subject invention therefore provides a high quality, low cost, methods and end products having increased tensile strength at the bond. An aluminum and copper strap, for example, may be achieved, according to the methods and products of the subject invention which can be used for battery cells and the like.

The methods and products of the subject invention may also be useful, or example, in the automotive industry. Currently, an increasing number of vehicles are manufactured from an aluminum body. Conventionally, the electrical wiring utilized to ground a vehicle body is made from copper. Therefore, there is an increasing need to provide a terminal that has an aluminum end attached to the automobile's body with an opposing end made of copper in order to electrical ground the vehicle. Thus, the subject invention is suitable again for use as a strap, or terminal connection for applications where two different materials, such as aluminum and copper must be electrically connected.

Although the subject invention has been described with respect to preferred embodiments, those skilled in the art will readily appreciated that changes or alterations in the sequences described or modifications thereto may be made without departing from the spirit or scope of the subject invention as defined by the appended claims.

What is claimed is:

1. A method for creating a metallurgic bond between at least two metal sheet structures comprising the steps of:
   a) providing a first structure of a first material and a second structure of a second material, the first and second materials not being compatible for welding;
   b) positioning a first side surface of the first structure having a first profile disposed into a second side surface of the second metal sheet structure having a second profile, wherein the first and second metal sheet structures fit together to form a first composite structure, wherein the second profile extends both above and below the first profile when the first profile of the first metal sheet structure is inserted into the second profile of the second metal sheet structure so that first profile is sandwiched between the second profile; and
   c) solid-phase bonding and sintering the first composite structure to form a metallurgic bond between the first and second metal sheet structures.

2. The method of claim 1, further comprising the steps of: profiling the first side surface of the first metal sheet structure to form the first profile and profiling the first side surface of the second metal sheet structure to form the second profile, prior to positioning the first and second metal sheet structures together at a first complimentary region.

3. The method of claim 2, wherein the first and second profiles comprise a plurality of angles so that the complimentary first composite structure includes a plurality of non-vertical surfaces at the first complimentary region.

4. The method of claim 1, further comprising providing at least one of the first and second metal sheet structures in a plurality of sections.

5. The method of claim 4, wherein the plurality of sections are positioned on top of each other as layers.

6. The method of claim 1, further comprising the steps of:
   d) providing a third metal sheet structure of a third material, the second and third materials not being compatible for welding;
   e) positioning a first side surface of the third metal sheet structure having a third profile into to a second side surface of the second metal sheet structure having a fourth profile, the third and fourth profiles being complementary, whereby the third and fourth profiles fit together to form a second composite metal sheet structure and the fourth profile extends both above and below the third profile when the third profile of the third metal sheet structure is inserted into the fourth profile of the second metal sheet structure so that third profile is sandwiched between the fourth profile; and
   f) solid-phase bonding and sintering the complimentary second composite structure to form a metallurgic bond between the second and third metal sheet structures.

7. The method of claim 6, wherein the first and third materials are substantially the same.

8. The method of claim 6, further comprising the steps of: profiling the first side surface of the third metal sheet structure to form the third profile and profiling the second side surface of the second metal sheet structure to form the fourth profile, prior to positioning the second and third metal sheet structures together at a second complimentary region.

9. The method of claim 8, wherein the first profile and the third profile are substantially the same.

10. The method of claim 6, wherein the third and fourth profiles comprises a plurality of angles so that the complimentary second composite structure includes a plurality of non-vertical surfaces at the second complimentary region.

11. The method of claim 6, further comprising providing the third metal sheet structure in a plurality of sections.

12. The method of claim 11, wherein the plurality of sections can be positioned on top of each other as layers.

13. The method of claim 6, wherein step c) and step f) occur substantially at the same time.

14. The method of claim 6, further comprising the step of: splitting the first composite structure and the second composite structure after forming the metallurgic bond.

15. The method of claim 6, wherein each of the first, second and third metal sheet structure are selected from the group consisting of a slug, a slab and a block of a metallic material.

16. A method for creating a metallurgic bond between at least two metal sheet structures comprising the steps of:
   a) providing a first sheet structure of a first metal and a second sheet structure of a second metal, the first and second metals not being compatible for welding wherein at least one of the first and second sheet structures are made up of a plurality of sections;
   b) providing a first profile in a first side surface of the first sheet structure, formed into a plane formed along a thickness direction of the first sheet structure;
   c) providing a second profile in an second side surface of the second sheet structure, formed into a plane formed along a thickness direction of the second sheet structure;
   d) positioning the first profile of the first side surface of the first sheet structure into the second profile of the second side surface of the second sheet structure at an complimentary region so that they mate to form a composite sheet structure; and
   e) solid-phase bonding and sintering the composite sheet structure to form a metallurgic bond between the first and second sheet structures,
   wherein the second profile extends both above and below the first profile when the first profile of the first sheet structure is inserted into the second profile of the second sheet structure so that first profile is sandwiched between the second profile.

17. The method of claim 16, wherein the geometric profiles comprise a plurality of angles so that the complimentary composite structure includes a plurality of non-vertical surfaces at the complimentary region.

* * * * *